United States Patent Office 3,183,151
Patented May 11, 1965

3,183,151
TREATMENT OF HYPOCHOLERESIS WITH 1-CYCLOHEXYL-2-METHYL-1-PROPANOL
Joseph Nordmann, Paris, France, assignor, by mesne assignments, to Etablissements Kuhlmann, Paris, France, a corporation of France
No Drawing. Filed Jan. 5, 1962, Ser. No. 164,597
Claims priority, application France, Jan. 6, 1961, 848,992
The portion of the term of the patent subsequent to Jan. 29, 1980, has been disclaimed
2 Claims. (Cl. 167—55)

It has been found that 1-cyclohexyl-2-methyl-1-propanol possesses chloreretic and sedative properties, as well as an action on digestive disturbances. These properties have been revealed by pharmacology and confirmed therapeutically.

1-cyclohexyl-2-methyl-1-propanol has the formula:

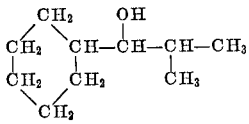

This compound may be used, for example, in the form of gelatine-coated capsules containing a dose of 400 mg. of product.

It is an oily, odoriferous liquid, insoluble in water and fat-soluble. Its boiling point is 106° C. to 108° C. under a pressure of 22 mm. of mercury. It may be characterised, for example, by the formation of its carbamate, which is a white crystalline compound with a melting point of 157° C.

It may be prepared, for example, by the method briefly proposed by Favorosky and Charitonova (Jour. für Prak. Chemie (2), 38, p 695 (1913)), from magnesium-cyclohexyl-chloride by the action of isobutyric aldehyde in an ethyl ether medium. The preparation may be carried out, for example, as follows:

96 parts by weight of magnesium, 400 parts by volume of dry ethyl ether and 30 parts by weight of cyclohexyl-chloride are introduced into an apparatus provided with a stirrer, a condenser and a gauge; the reaction is started by means of a little ethyl magnesium bromide, separately prepared. Once the reaction has started, a solution of 444 parts by weight of cyclohexyl chloride in 1000 parts by volume of dry ethyl ether is slowly added. When all the cyclohexyl chloride has been added, heating at the boil is continued for an hour. The solution of magnesium compound obtained is then cooled to −10° C. and a solution of 259 parts by weight of isobutyric aldehyde in 1000 parts by volume of dry ethyl ether is slowly added thereto, while maintaining the temperature at −10° C. Stirring is continued for an hour and the mixture is left to stand overnight. The contents of the apparatus are poured on to 2000 to 3000 parts by weight of ice with vigorous stirring and the magnesia formed is solubilised by addition of 700 parts by volume of 18% hydrochloric acid (d.=1.072). The ethereal layer is separated, washed with water until neutral and dried over anhydrous sodium sulphate. After evaporation of the ether, the residue is distilled under a vacuum of 20 mm. of mercury. The fraction passing over between 102° C. and 104° C. which consists of the 1-cyclohexyl-2-methyl-1-propanol is collected. Yield: about 70% of theory.

Pharmacological properties

This compound is not very toxic, its lethal dose 50 being 1.50 g./kg. on mouse C-57 when it is injected intraperitoneally in olive oil solution. When taken orally, the lethal dose 50 on the mouse is 3 g./kg.

This compound does not irritate either the stomach or the intestines of the guinea pig. It is devoid of toxicity on the kidney and on the hematopoietic system.

1-cyclohexyl-2-methyl-1-propanol is found to have various pharmacodynamic properties.

Its most remarkable property is a very strong choleretic action, which extends for a much longer time than that of the conventional choleretics. It acts as a true choleretic. For example, if a dose of one-fifth of the maximum non-toxic dose (say 300 mg./kg.) is administered intraduodenally to a rat, and if the bile flow is measured by a timed tubing, an increase of the bile flow after 1, 2 and 3 hours is obtained which is respectively 167%, 227% and 258%, although the sodium dehydrocholate taken as drug control at the same dose, which represents three-tenths of the maximum non-toxic dose, gives respectively values of 294%, 78% and 6% increase of the basic choleresis. This then represents for the third hour which follows the ingestion of the product an activity 43 times greater than that of this conventional choleretic. Its action is immediate and is shown experimentally in a clear way in the first 15 minutes which follow the ingestion. The increase of the bile flow although considerable, is regular and maintains in animal experimentation for at least three hours, a large bile flow which is not accompanied by notable hydrocholeresis.

On the other hand, 1-cyclohexyl-2-methyl-1-propanol possesses activity on the central nervous system, which activity is of a slight sedative type. Its actions have been able to be shown by a certain number of tests: tests on the abolition of Preyer's reflex, on the sedative actions called "Courvoisier's," on the turning rod, on the pinching reflex and on the sleep reflex. But it does not possess notable hypnotic effect as the test of putting to sleep and of duration of the sleep has shown.

It further possesses a certain analgesic action as has been shown by the hot plate test.

As a whole, then, these actions enable 1-cyclohexyl-2-methyl-1-propanol to be classed as an excellent choleretic and a sedative without neurotoxic effect.

Applications in human therapeutics

These results have led to clinical experimentation bearing on patients suffering from hepatic insufficiency accompanied by digestive disturbances and subjected to functional disorders, especially when they do not follow a very strict diet. With these ailments, previous jaundice, malaria or lithiasis are often recorded.

The treatment has consisted in giving 3 to 4 gelatine-coated capsules each pill containing 400 mg. of 1-cyclohexyl-2-methyl-1-propanol daily for 10 to 15 days. In the case of these patients, taking the medicine has produced a very great improvement in the digestion, as well as the disappearance of the distressing attacks of the right hypochondrium and the headaches accompanying their digestive disorders.

I claim:
1. Process for the treatment of hypocholeresis which comprises orally administering to a human being 1-cyclohexyl-2-methyl-1-propanol.
2. Process for the treatment of hypocholeresis which comprises orally administering to a human being 1-cyclohexyl-2-methyl-1-propanol in the form of gelatine-coated capsules.

References Cited by the Examiner
UNITED STATES PATENTS
3,075,881  1/63  Nordmann _____ 167—65
FOREIGN PATENTS
599,365  3/48  Great Britain.

FRANK CACCIAPAGLIA, Jr., *Primary Examiner*.
IRVING MARCUS, LEWIS GOTTS, *Examiners*.